United States Patent
Humphreys et al.

(10) Patent No.: US 9,875,385 B1
(45) Date of Patent: Jan. 23, 2018

(54) METHOD AND SYSTEM FOR SHARING OF PRODUCT RECEIPTS

(71) Applicant: MasterCard International Incorporated, Purchase, NY (US)

(72) Inventors: Derek Humphreys, County Dublin (IE); Stephen Elder, Dublin (IE); Edward Kilbane, Greystones (IE); Ramson Tutte, Maynooth (IE); John Clerkin, Greystones (IE); Adam Kenneth Hosp, Lake St. Louis, MO (US); Sarah Louise Cunningham, County Dublin (IE); Rebecca Fredric, Milton (CA); Paul Lawless, Blackrock (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/332,269

(22) Filed: Oct. 24, 2016

(51) Int. Cl.
  *G06K 15/00* (2006.01)
  *G06K 7/10* (2006.01)
  *G07G 5/00* (2006.01)

(52) U.S. Cl.
  CPC .......... *G06K 7/10861* (2013.01); *G07G 5/00* (2013.01)

(58) Field of Classification Search
  CPC ........ G06K 15/00; G06K 19/00; G06F 17/00; G06Q 30/00
  USPC ....... 235/383, 375, 487; 705/14.51, 27.1, 28
  See application file for complete search history.

(56) References Cited

U.S. PATENT DOCUMENTS

| | | | |
|---|---|---|---|
| 2007/0069013 A1 | 3/2007 | Seifert et al. | |
| 2012/0271712 A1* | 10/2012 | Katzin | G06Q 30/06 705/14.51 |
| 2012/0284081 A1* | 11/2012 | Cheng | G06Q 30/02 705/7.29 |
| 2015/0052035 A1* | 2/2015 | Calman | G06Q 40/02 705/35 |

(Continued)

FOREIGN PATENT DOCUMENTS

AU    2012238211 A1    1/2014

OTHER PUBLICATIONS

International Search Report dated Nov. 20, 2017 issued in corresponding PCT Application PCT/US2017/050942.

*Primary Examiner* — Edwyn Labaze
(74) *Attorney, Agent, or Firm* — Buchanan Ingersoll & Rooney PC

(57) ABSTRACT

A method for transmitting line item data from an electronic receipt comprising storing a plurality of receipt data entries affiliated with a consumer account based on a consumer identifier. The method comprises storing a plurality of merchant identifiers affiliated with one or more product data files for products sold by a merchant. The method further receives a transaction message for a payment transaction using the consumer identifier via a payment network and executes a query on the electronic receipt database from a first consumer device to identify one or more products purchased in the payment transaction. The method generates an electronic receipt displaying purchase information for the one or more products and links the purchase information on the electronic receipt to the product data file for the one or more products for transmittal.

20 Claims, 9 Drawing Sheets

(56) References Cited

U.S. PATENT DOCUMENTS

2015/0356616 A1\* 12/2015 Kodama ............ G06Q 30/0267
705/14.51

\* cited by examiner

US 9,875,385 B1

METHOD AND SYSTEM FOR SHARING OF PRODUCT RECEIPTS

FIELD

The present disclosure relates to the sharing of digital product receipts, specifically the use of a digital product receipt to purchase the product on the receipt via a mobile device.

BACKGROUND

Mobile communication devices, such as cellular phones, smart phones, and tablet computers, are sometimes used to conduct a payment transaction with a merchant at a point of sale. In some instances, the mobile device is specifically configured to provide payment information for the payment method to be used to fund a particular payment transaction. Consumers will often purchase a particular product over other particular products, or purchase a specific product at one merchant over another, for any variety of reasons, such as quality, price, customer service, reliability, convenience. One factor that may be the most influential for a large number of consumers when it comes to selecting a merchant or product over another is the price. Some consumers have been known to go well out of their way to visit a merchant to purchase a product for even the smallest discount over the price offered for the product by a competing merchant. When consumers believe they received a great deal, many consumers are likely to share where they purchased a product and the specific price they paid with other consumers.

In some instances, consumers verbally share with other consumers where they purchased certain products and how much they paid. Other ways consumers share is by taking a picture of their latest purchase and sharing the picture and their experience on social media. In yet other instances, consumers may simply take a picture of what they bought and text it to their friend or relative to share their recent experience.

Most commonly, these methods require a tremendous amount of work for the consumer to share their recent purchases, making these conventional methods outdated, and subject to human error, especially in instances where product pricing may vary for multiple physical locations of a single merchant. Furthermore, such tools often are time consuming, leading to consumers not sharing as much information with others.

Thus, there is a need for a technical solution for an improved process of sharing of digital receipts for use in providing an easier mechanism to share product purchase information.

SUMMARY

The present disclosure relates to the sharing of digital product receipts between a first consumer and a second consumer, and the use of a digital product receipt to purchase the product on the receipt via a mobile device by a second consumer.

A method for transmitting line item data from an electronic receipt may comprise storing, in an electronic receipt database of a processing server, a plurality of receipt data entries affiliated with a consumer account based on a consumer identifier. Each receipt data entry may include a merchant identifier, and line item data related to one or more products. The method may further comprise storing, in a merchant product database of a processing server, a plurality of merchant identifiers. Each merchant identifier may be affiliated with one or more product data files for products sold by the merchant. Each product data file may include electronic records representing at least a product description, a product identifier, product options, product price information and/or hyperlinks to sources of this information. The method may comprise receiving, by a receiving device of the processing server, a transaction message for a payment transaction using the consumer identifier via a payment network. The transaction message may be formatted based on one or more standards and include a plurality of data elements including at least a first data element configured to store the merchant identifier and one or more additional data elements configured to store the line item data related to the one or more products. The method may comprise executing, by the processing device of the processing server, a query on the electronic receipt database from a first consumer device to identify one or more products purchased in the payment transaction. The method may further comprise determining, by the processing device of the processing server, if the merchant identifier corresponding to the identified one or more products is one of a plurality of merchant identifiers stored in the merchant product database. The merchant identifier may indicate a particular merchant from a plurality of merchants.

In some implementations, when the merchant identifier is not one of the plurality of merchant identifiers stored in the merchant product database, the method comprises requesting one or more product data files for products sold by the merchant. Each product data file may include electronic records representing at least a product description, a product identifier, product options, product price information and/or hyperlinks to sources of this information. In other implementations, when the merchant identifier corresponding to the identified one or more products is one of the plurality of merchant identifiers stored in the electronic receipt database, the method comprises executing, by the processing device of the processing server, a query on the merchant identifier to identify one or more product data files for products sold by the merchant corresponding to the identified one or more products.

The method may comprise generating, by the processing device of the processing server, an electronic receipt displaying a purchase information for the one or more products. The method may comprise linking, by the processing device of the processing server, the purchase information on the electronic receipt to the product data file for the one or more products appearing thereon either received from the merchant or identified in the electronic receipt database. The method may comprise transmitting, by the transmitting device of the processing server, the electronic receipt.

A system for transmitting line item data from an electronic receipt may comprise an electronic receipt database of a processing server configured to store a plurality of receipt data entries affiliated with a consumer account based on a consumer identifier. Each receipt data entry may include a merchant identifier and line item data related to one or more products. The system may comprise a merchant product database of the processing server configured to store a plurality of merchant identifiers. Each merchant identifier may be affiliated with one or more product data files for products sold by the merchant. Each product data file may include electronic records representing at least a product description, a product identifier, product options, product price information and/or hyperlinks to sources of this information. The system comprises a receiving device of the processing server configured to receive a transaction message for a payment transaction using the consumer identifier via a payment network. The transaction message may be formatted based on one or more standards and include a plurality of data elements including at least a first data element configured to store the merchant identifier and one or more additional data elements configured to store the line item data related to the one or more products. The system may comprise a processing device of the processing server configured to execute a query on the electronic receipt database from a first consumer device to identify one or more products purchased in the payment transaction. The processing device may further be configured to determine if the merchant identifier corresponding to the identified one or more products is one of a plurality of merchant identifiers stored in the merchant product database. The merchant identifier may indicate a particular merchant from a plurality of merchants.

In some implementations, when the merchant identifier is not one of the plurality of merchant identifiers stored in the merchant product database, the processing device may comprise requesting one or more product data files for products sold by the merchant. Each product data file may include electronic records representing at least a product description, a product identifier, product options, product price information and/or hyperlinks to sources of this information. In other implementations, when the merchant identifier corresponding to the identified one or more products is one of the plurality of merchant identifiers stored in the electronic receipt database, the processing device may comprise executing a query on the merchant identifier to identify one or more product data files for products sold by the merchant corresponding to the identified one or more products.

The processing device may generate an electronic receipt displaying a purchase information for the one or more products and link the purchase information on the electronic receipt to the product data file for the one or more products appearing thereon either received from the merchant or identified in the electronic receipt database. The system may comprise a transmitting device of the processing server configured to transmit the electronic receipt.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
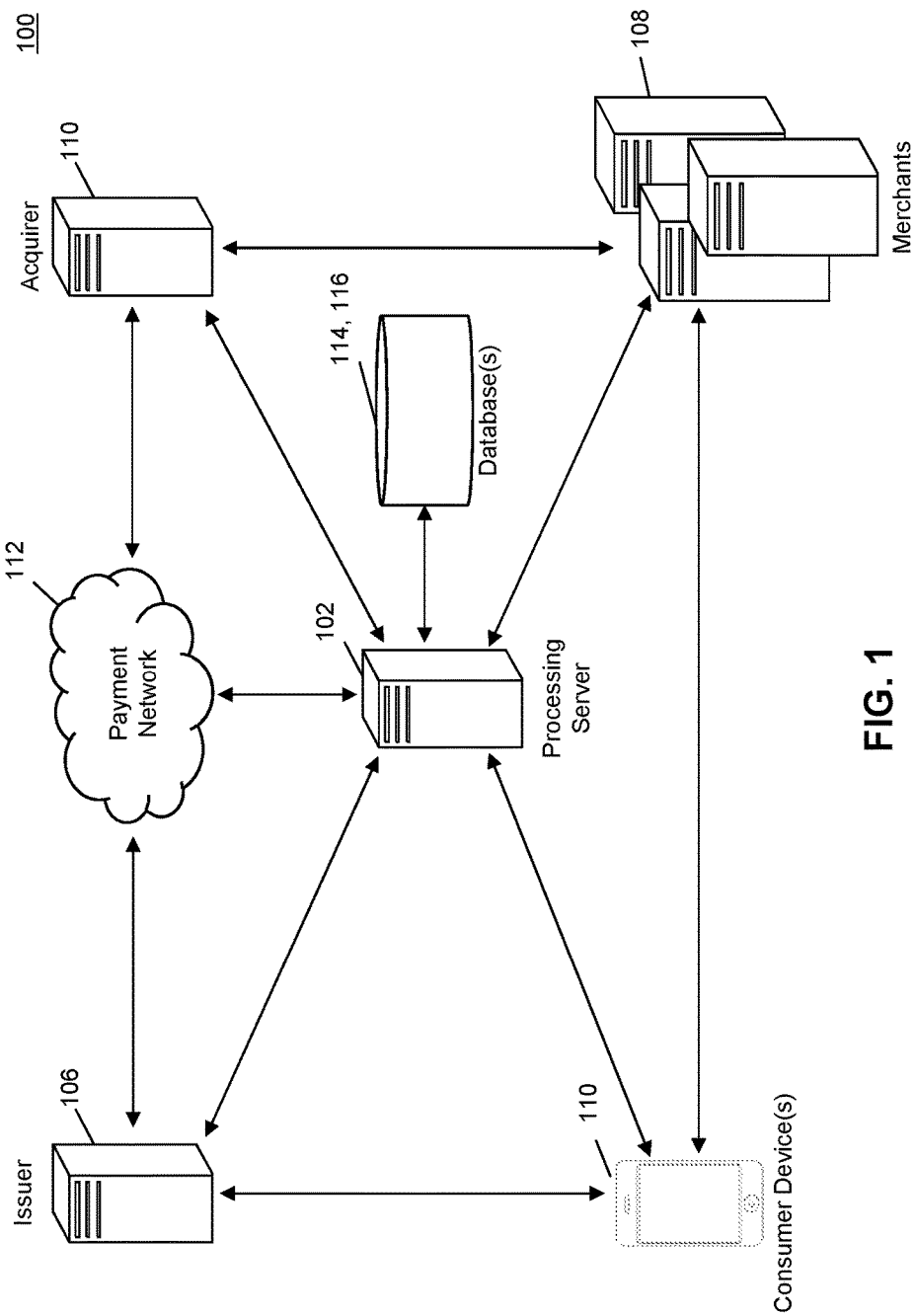
FIG. 1 is a block diagram illustrating a system architecture for sharing digital product receipts for products using payment transaction data in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant. In some instances, as used herein, the term "merchant" may refer to an apparatus or device of a merchant entity.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Social Network—A social network may be an entity that operates a network which hosts social websites. The social network may also operate the hardware and/or software used in the management and operation of the network, such as the websites and application programs used by the individual and their followers in accessing the network. Social networks may include, for example, Facebook, Twitter, FourSquare, Snapchat, Google+, YouTube, etc. The social network may provide for a network of social interactions and relationships that is used by individuals to manage the relationships and interactions and share content with their followers in the social network, such as by sharing images, audio, video, text, etc.

System for Generating a Digital Product Receipt

FIG. 1 is a block diagram illustrating a system architecture for sharing digital product receipts for products using payment transaction data in accordance with exemplary embodiments.

The system 100 may include a processing server 102. The processing server 102, discussed in more detail below, may comprise a plurality of databases (e.g., electronic receipt database, a merchant product database, etc.) 114, 116, a receiving device, a processing device, and/or a transmitting device. The processing server 102 may be configured to transmit line item data from an electronic receipt according to an exemplary embodiment.

The processing server 102 may comprise of an electronic receipt database configured to store a plurality of receipt data entries affiliated with a consumer account based on a consumer identifier. Each receipt data entry may include a merchant identifier and line item data related to one or more products. The consumer identifier may be one or more of: credit card, a debit card, a bank card, and/or a mobile payment. The merchant identifier may be any alphanumeric code and/or any other identifier that identifies a particular merchant. Line item data related to the one or more products may be, for example, a product description, a product price, the quantity of the products purchased, and/or any other data affiliated with the product.

The processing server 102 may comprise of a merchant product database configured to store a plurality of merchant identifiers. Each merchant identifier may be affiliated with one or more product data files for products sold by the merchant 108. Each product data file may include electronic records representing at least a product description, a product identifier, product options, product price information and/or hyperlinks to sources of this information. The product data files for the one or more products may be identified based on at least one of: the product description, the product identifier, the product price information and/or any other relevant product information. For example, a merchant identifier may be for example, a hardware store named Smith's Hardware Store. Smith's Hardware Store may sell a plurality of hardware products such as tools, home appliances, garden furniture, etc. Each of the products may be identified based on a particular number affiliated with the product (e.g., UPC and/or merchant product code). A store, such as a clothing store may have a unique merchant identifier and the products the clothing store sells may each have their own unique product identifiers.

The processing server 102 may comprise of a receiving device configured to receive a transaction message for a payment transaction using the consumer identifier via a payment network 112, wherein the transaction message is formatted based on one or more standards and includes a plurality of data elements including at least a first data element configured to store the merchant identifier and one or more additional data elements configured to store the line item data related to the one or more products.

The processing server 102 may comprise of a processing device configured to execute a query on the electronic receipt database from a first consumer device 110 to identify one or more products purchased in the payment transaction. The processing server 102 may determine if the merchant identifier corresponding to the identified one or more products is one of a plurality of merchant identifiers stored in the merchant product database. The merchant identifier may indicate a particular merchant from a plurality of merchants. In some implementations, when the merchant identifier is not one of the plurality of merchant identifiers stored in the merchant product database, the processing device may request one or more product data files for products sold by the merchant. Each product data file may include electronic records representing at least a product description, a product identifier, product options, product price information and/or hyperlinks to sources of this information.

In some implementations, when the merchant identifier corresponding to the identified one or more products is one of the plurality of merchant identifiers stored in the electronic receipt database, the processing device may execute a query on the merchant identifier to identify one or more product data files for products sold by the merchant corresponding to the identified one or more products. The processing device may generate an electronic receipt displaying a purchase information for the one or more products and link the purchase information on the electronic receipt to the product data file for the one or more products appearing thereon either received from the merchant or identified in the electronic receipt database. For example, if a consumer obtain a receipt showing the items purchased at Smith's Hardware Store.

The processing server 102 may be further configured to convert, in the electronic receipt database, the product identifier to a Universal Product Code (UPC) when the product identifier is a merchant product code by querying the merchant product database based on the merchant identifier. The merchant product database may comprise the merchant product code, the UPC, the product description, product options and product price information. The merchant product code may be one or more of: a QR code, a barcode, a data matrix code, and a PDF417 code.

The processing server 102 may comprise of a transmitting device of the processing server configured to transmit the electronic receipt. The electronic receipt may be transmitted to a second consumer device. In some implementations, when the second consumer device has a second consumer account based on a second consumer identifier, providing the second consumer device the purchase information on the electronic receipt for the product data file for the one or more products. The purchase information may permit the second consumer device to purchase the one or more products.

In some implementations, when the second consumer device does not have the second consumer account based on the second consumer identifier, a merchant information may be displayed for the one or more products identifying a merchant name and the line item data related to the one or more products, and a download option may be provided for the second consumer device to create the second consumer account in order to provide the second consumer device the purchase information on the electronic receipt for the product data file for the one or more products. The second consumer device may obtain the same product price information as the first consumer device when the second consumer device purchases the one or more products. The merchant information may comprise a link to a merchant website displaying the one or more products for purchase. For example, if the first consumer shared their receipt from Smith's Hardware Store and the receipt showed that the first consumer purchased a shovel for $10.50. The second consumer may be able to select the shovel on the electronic receipt and also purchase the shovel for $10.50 as well as share their electronic receipt when generated with a third consumer.

In other implementations, when the second consumer device has a second consumer account based on a second consumer identifier, the second consumer device may be provided the purchase information on the electronic receipt for the product data file for the one or more products. The purchase information may permit the second consumer device to purchase the one or more products. When the second consumer device does not have the second consumer account based on the second consumer identifier, a merchant information may be displayed for the one or more products identifying a merchant name and the line item data related to the one or more products, and a download option may be provided for the second consumer device to create the second consumer account in order to provide the second consumer device the purchase information on the electronic receipt for the product data file for the one or more products. The second consumer device may obtain the same product price information as the first consumer device when the second consumer device purchases the one or more products. The merchant information may comprise a link to a merchant website displaying the one or more products for purchase.

The electronic receipt database further configured to store a plurality of receipt data entries affiliated with the second consumer account based on the second consumer identifier. Each receipt data entry may include a merchant identifier, and a line item data related to one or more products. The receiving device may be further configured to receive a transaction message for a payment transaction using the second consumer identifier via a payment network. The transaction message may be formatted based on one or more standards and includes a plurality of data elements including at least a first data element configured to store the merchant identifier and one or more additional data elements configured to store the line item data related to the one or more products.

The processing server 102 further configured to execute a query on the electronic receipt database from the second consumer device to identify one or more products and generate an electronic receipt displaying a purchase information for the one or more products. The transmitting device may be further configured to transmit the electronic receipt to a third consumer device.

The processing server 102 may be part of a payment network 112 configured to process payment transactions, and may receive transaction data for payment transactions processed thereby for use in sharing digital product receipts for products using payment transaction data.

The system may include one or more merchants 108. The processing server 102 may be configured to analyze transaction data corresponding to payment transactions involving the merchants 108 to determine that a specific product was purchased, identify the price of the product charged in the payment transaction, and display the product purchased on digital receipt (e.g., electronic) with the purchase information for use in conducting a second transaction using the data displayed via the digital receipt.

Each of the merchants 108 in various geographic areas may be configured to initiate a payment transaction for the purchase of a product by a consumer. The initiation of the payment transaction may include the use of a point of sale (POS) device or other suitable type of computing device to input or otherwise receive product details for one or more products being purchased and payment details from a consumer that are associated with a transaction account used to fund the payment transaction. The POS or other computing system of the merchant 108 may transmit transaction details for the payment transaction, that include the product details and payment details, to another entity, such as a gateway process or acquiring financial institution (e.g., acquirer 110), for forwarding on to the payment network 112 in a transaction message for processing using the payment rails. The payment rails and additional information regarding the transmission of payment details from a merchant 108 to a payment network 112 for processing is discussed in more detail below with respect to the process 700 illustrated in FIG. 7.

The system may comprise a consumer device 110 to initiate a payment transaction at a point of sale terminal. The consumer device 110 may be a mobile telephone, a tablet, a PC, lap top and/or any other suitable mobile device. Once the payment transaction for the purchase of a product has been initiated at the merchant 108, the payment network 112 may receive a transaction message for the payment transaction. The transaction message may be formatted based on one or more standards governing the exchange of financial transaction messages, such as the International Organization for Standardization's ISO 8583 standard. The transaction message may include a plurality of data elements, such as set forth in the associated standard(s). For example, the transaction message may include a plurality of data elements including at least a first data element configured to store the merchant identifier and one or more additional data elements configured to store the line item data related to the one or more products. The transaction message may also include a message type indicator, which may indicate a type for the transaction message. For example, transaction messages transmitted from the merchant 108 to the payment network 112 (e.g., via one or more intermediate entities) may include a message type indicator indicative of an authorization request.

In some embodiments, the transaction message may include one or more data elements configured to store product and pricing data. The product and pricing data may include a product identifier and a product price which may be part of a merchant product code and/or a UPC. The product identifier may be a unique value associated with a product purchased in the related payment transaction, such as a UPC, stock-keeping unit, European article number, International Standard Book Number, registration number, serial number, and/or other suitable identification value. The merchant product code may be one or more of a QR code, a barcode, a data matrix code, and a PDF417 code and/or other suitable identification value. The product price may be a price charged, paid, or otherwise associated with the related product. In some instances, a transaction message may include product and pricing data for multiple products. In some cases, a single data element may store all of the product and pricing data for a payment transaction, and may be formatted in any suitable format for the storage of the associated data therein. In other cases, a separate data element may be used for the storage of product and pricing data for each product purchased in the related payment transaction. In yet other cases, each data element may be configured to store either product data or pricing data for a single product purchased in the related payment transaction.

In some embodiments, the transaction message may include an addendum, which may comprise additional data not stored in the data elements of the transaction message. In such embodiments, the product and pricing data may be stored in the addendum to the transaction message. In some instances, the data stored in the addendum may be formatted and/or included as set forth by the payment network 112, processing server 102, merchants 108, or other entity involved in the processing of payment transactions, such as issuers, acquirers, or gateway processors. In some embodiments, the processing server 102 may be configured to analyze product pricing based on product and pricing data stored in both data elements and addendums of payment transactions.

The transaction messages and/or data included therein may be provided to the processing server 102 as part of the payment network 112. In some embodiments, the processing server 102 may be external to the payment network 112. In such embodiments, the payment network 112 may electronically transmit the transaction messages to the processing server 102 via the payment rails or another suitable communication network, such as a local area network, wide area network, wireless area network, radio frequency network, the Internet, etc.

The processing server 102 may be configured to parse received transaction messages to deconstruct the transaction messages for identification of the data elements and addendum data included therein. The processing server 102 may extract the product and pricing data of the associated products purchased in the payment transaction. As discussed below, the processing server 102 may maintain a database of pricing data for a particular product as identified via the data elements parsed from received transaction messages.

By receiving transaction messages that are transmitted to a payment network 112 via the payment rails as part of the processing of a payment transaction, the processing server 102 can ensure that the product data being captured is up-to-date and accurate, which may be significantly improved over traditional systems in that the technology is improved by requiring less human interaction, less data entry, less processing, while increasing accuracy, speed, timeliness through a more automated process using the payment rails as a source of accurate, near real time information that can be used to produce the digital receipt. That is, such capture of the data may be faster than traditional methods for gathering the pricing data, and may also be at significantly less risk for human error due to the price being superimposed in a data signal that is transmitted and parsed by a specially configured technical system that is specifically built and programmed for the use thereof. As such, the systems and methods discussed herein may provide for significantly improved analysis of generating a digital receipt for products using data parsed from transaction messages exchanged via the payment rails using a mixture of legacy technology and new functionality and technology not previously seen.

The system may comprise of an issuing institution (e.g., issuer 106) which may establish a letter or line of credit in favor of a beneficiary (e.g., consumer), and honors drafts drawn by the beneficiary against the amount specified in the letter or line of credit.

In an exemplary embodiment, a consumer may via a consumer device 110 present a product for checkout at a POS terminal of a merchant 108. The merchant may communicate with a processing server 102, payment network 112, an acquirer 110, and/or an issuer 106 in order to complete the transaction. The processing server 102 may parse out data from the transaction and query databases 114, 116 in order to generate a digital receipt identifying the products purchased at the merchant 108 POS terminal. The digital receipt may be transmitted to the consumer device 110, so the consumer may select particular transactions to share with a second consumer via a second consumer device. The second consumer may then present the digital receipt to the merchant 108 POS to obtain the same product purchased by the consumer for the same price.

Processing Server

Figure 2:
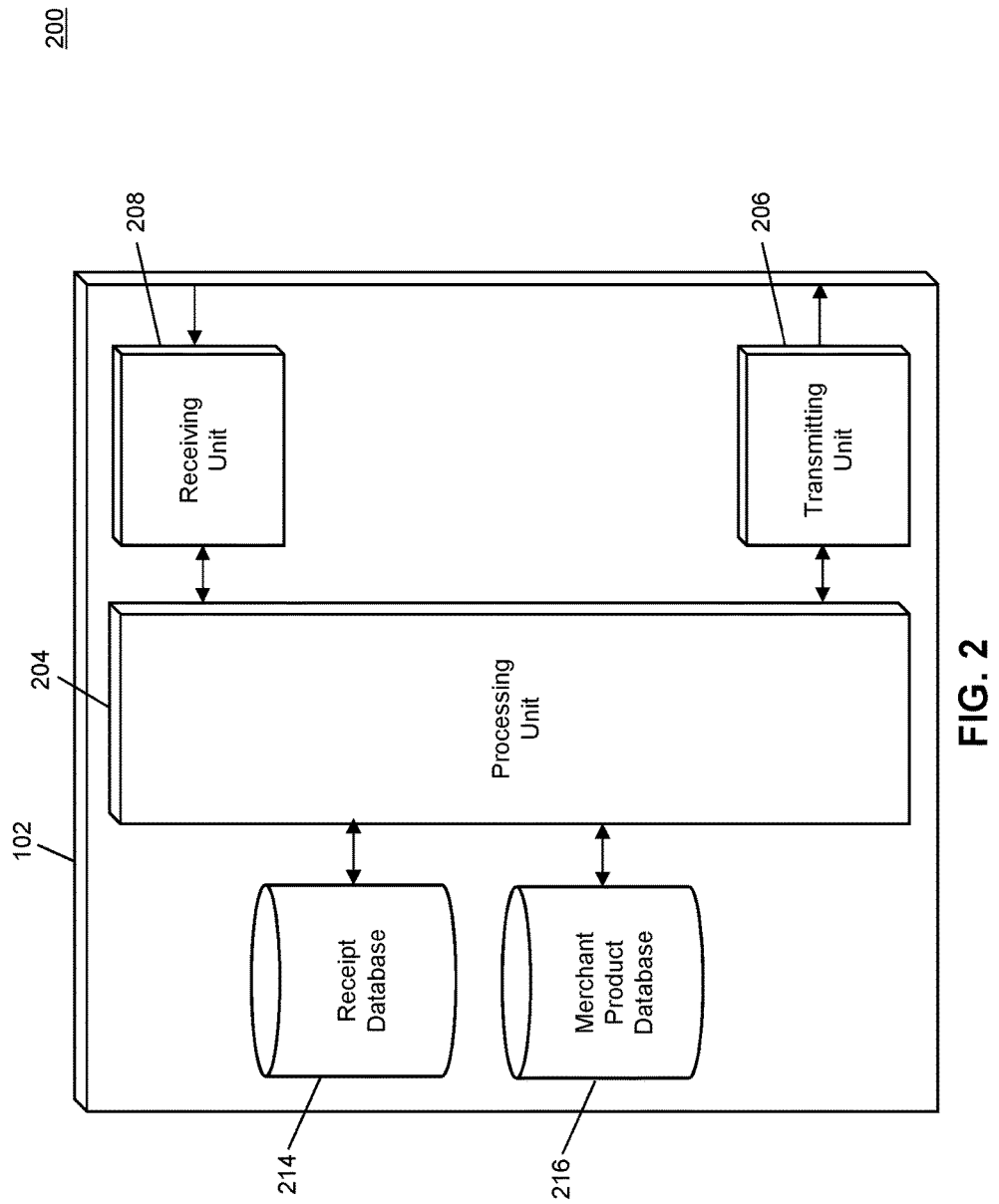
FIG. 2 is a block diagram illustrating the processing server of FIG. 1 for sharing digital product receipts for products using payment transaction data in accordance with exemplary embodiments.

FIG. 2 is a block diagram illustrating the processing server of FIG. 1 for sharing digital product receipts for products using payment transaction data in accordance with exemplary embodiments.

It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving unit 208. The receiving unit 208 may be configured to receive data over one or more networks via one or more network protocols. In some embodiments, the receiving unit 208 may be configured to receive data over the payment rails, such as using specially configured infrastructure associated with payment network 112 for the transmission of transaction messages that include sensitive financial data and information. In some instances, the receiving unit 208 may also be configured to receive data from merchants 108, data requesters, the payment network 112, and other entities via alternative networks, such as the Internet. In some embodiments, the receiving unit 208 may be comprised of multiple units, such as different receiving units for receiving data over different networks, such as a first receiving unit for receiving data over payment rails and a second receiving unit for receiving data over the Internet. The receiving unit 208 may receive electronically data signals that are transmitted, where data may be superimposed on the data signal and decoded, parsed, read, or otherwise obtained via receipt of the data signal by the receiving unit 208. In some instances, the receiving unit 208 may include a parsing module for parsing the received data signal to obtain the data superimposed thereon.

The receiving unit 208 may be configured to receive transaction messages from the payment network 112 (e.g., or from other entities as transmitted to the processing server 102 via the payment network 112) that include a data element configured to store data elements and/or addendum data configured to store pricing and product data. The receiving unit 208 may also receive a data signal superimposed with a data request electronically transmitted from a data requester, which may, when parsed by the receiving unit 208, include a product identifier and pricing data.

The processing server 102 may also include a processing unit 204. The processing unit 204 may be configured to perform the functions of the processing server 102 discussed herein as will be apparent to persons having skill in the relevant art. In some embodiments, the processing unit 204 may include and/or be comprised of a plurality of engines and/or modules specially configured to perform one or more functions of the processing unit 204. For example, the processing unit 204 may include a querying module configured to query databases included in the processing server 102 to identify information stored therein. In some instances, the processing unit 204 may include a parsing module or engine configured to parse data from data signals electronically received by the receiving unit 208, an encryption module or engine configured to decrypt received data or data signals or to encrypt data or data signals received or transmitted by the processing server 102, and any other modules suitable for performing the functions discussed herein.

The processing server 102 may include a merchant product database 216. The merchant product database 216 may be configured to store a plurality of product data entries corresponding to a particular merchant using a suitable data storage format and schema. Each product data entry may be configured to store a standardized data set (e.g., as standardized to each of the product data entries stored in the merchant product database 216) of data related to a product that includes at least a product identifier and a plurality of price values. The product identifier may be a unique value associated with the related product suitable for identification thereof. The plurality of price values may be a price for the related product and may be associated with a particular merchant.

In an exemplary embodiment, when a product is presented at a merchant POS terminal, the product data may be entered (e.g., via scanning barcode, manual entry, etc.) into the POS terminal to obtain item information such as the price and in order to allow a consumer to purchase the product. In some implementations, the product data may comprise a UPC. When this is the case, the merchant data particular to the merchant may be extracted by utilizing other data (e.g., IP address and/or any other data transmitted from the merchant POS to the processing device). In some implementations, the product data may comprise a particular merchant product code. The merchant product code may be unique to the merchant, and may comprise data identifying the merchant. The processing unit 204 may query the merchant product database 216 in order to search for additional product information and/or to proceed with the checkout process. When the product data is not affiliated with a particular merchant, the processing unit may request a merchant product list corresponding to merchant identifiers in order to store the data for future processing and to complete the current transaction.

In some embodiments, the processing server 102 may also include a receipt database 214. The receipt database 214 may be configured to store a plurality of transaction messages using a suitable data storage format and schema. The transaction messages may be transaction messages received by the receiving unit 208 from and/or via the payment network 112 corresponding to payment transactions that may be used by the processing server 102 in the analysis of prices for products as associated with merchants. In such embodiments, transaction messages received by the receiving unit 208 may be stored in the receipt database 214 for future use in identifying prices for products. In other embodiments, transaction messages may be used when received by the receiving unit 208 and not retained. In such embodiments, the receipt database 214 may be used for temporary storage of transaction messages.

In an exemplary embodiment, the receipt database 214 may store any digital receipt information generated by the processing server 102. The data in the receipt database 214 may be queried, for example, when a second consumer presents a digital receipt shared by a first consumer at a POS terminal of a merchant and/or at a merchant website. The data in the digital receipt may be queried in the receipt database 214 in order to provide the second consumer with the same product at the same price the first consumer paid.

The processing unit 204 may include a querying module. The querying module may be configured to execute queries on databases of the processing server 102 for the identification of data stored therein. The querying module may receive a query string or parameters as input, may execute a query on an indicated database, and may output data identified via the execution of the query on the database. For example, when a transaction message is received, the querying module may execute a query to find a product data entry. A query may be executed on the merchant product database 216 to identify an entry that includes a product identifier extracted from a data element and/or addendum included in the transaction message, and may output the identified product data entry. In another example, the querying module may execute a query on the receipt database 214 to identify a plurality of transaction messages that include a product identifier stored in a data element and/or addendum that corresponds to a product identifier parsed from a data request received by the receiving unit 208, such as for use in identifying product price and merchant associations for the identified product.

Product identifiers may be extracted from transaction messages via, for example, a data extraction module of the processing unit 204. The data extraction module may receive a transaction message as input and may identify and extract a product identifier from the transaction message, which may be produced as the output of the data extraction module. Product identifiers may be extracted from one or more corresponding data elements included in the transaction message, or from an addendum included in the transaction message. The data extraction module may also be configured to extract prices associated with product identifiers from transaction messages using similar processes.

The processing server 102 may further include a transmitting unit 206. The transmitting unit 206 may be configured to transmit data over one or more networks via one or more network protocols. In some embodiments, the transmitting unit 206 may be configured to transmit data over the payment rails, such as using specially configured infrastructure associated with payment network 112 for the transmission of transaction messages that include sensitive financial data and information, such as identified payment credentials. In some instances, the transmitting unit 206 may be configured to transmit data to data requesters, payment network 112, merchants 108, and other entities via alternative networks, such as the Internet. In some embodiments, the transmitting unit 206 may be comprised of multiple units, such as different transmitting units for transmitting data over different networks, such as a first transmitting unit for transmitting data over the payment rails and a second transmitting unit for transmitting data over the Internet. The transmitting unit 206 may electronically transmit data signals that have data superimposed that may be parsed by a receiving computing device. In some instances, the transmitting unit 206 may include one or more modules for superimposing, encoding, or otherwise formatting data into data signals suitable for transmission.

The transmitting unit 206 may be configured to electronically transmit a data signal superimposed with pricing data via a suitable communication network. In some embodiments, the transmitting unit 206 may also be configured to electronically transmit a data signal superimposed with a data request to the payment network 112, such as via the payment rails or an alternative communication network, that may comprise a request for payment transaction, including a request that specified one or more product identifiers and/or geographic locations for which transaction messages are requested.

The processing server 102 may also include a memory. The memory may be configured to store data for use by the processing server 102 in performing the functions discussed herein. The memory may be configured to store data using suitable data formatting methods and schema and may be any suitable type of memory, such as read-only memory, random access memory, etc. The memory may include, for example, encryption keys and algorithms, communication protocols and standards, data formatting standards and protocols, program code for modules and application programs of the processing unit 204, and other data that may be suitable for use by the processing server 102 in the performance of the functions disclosed herein.

Exemplary Product Codes

Figures 3A, 3B, 3C:
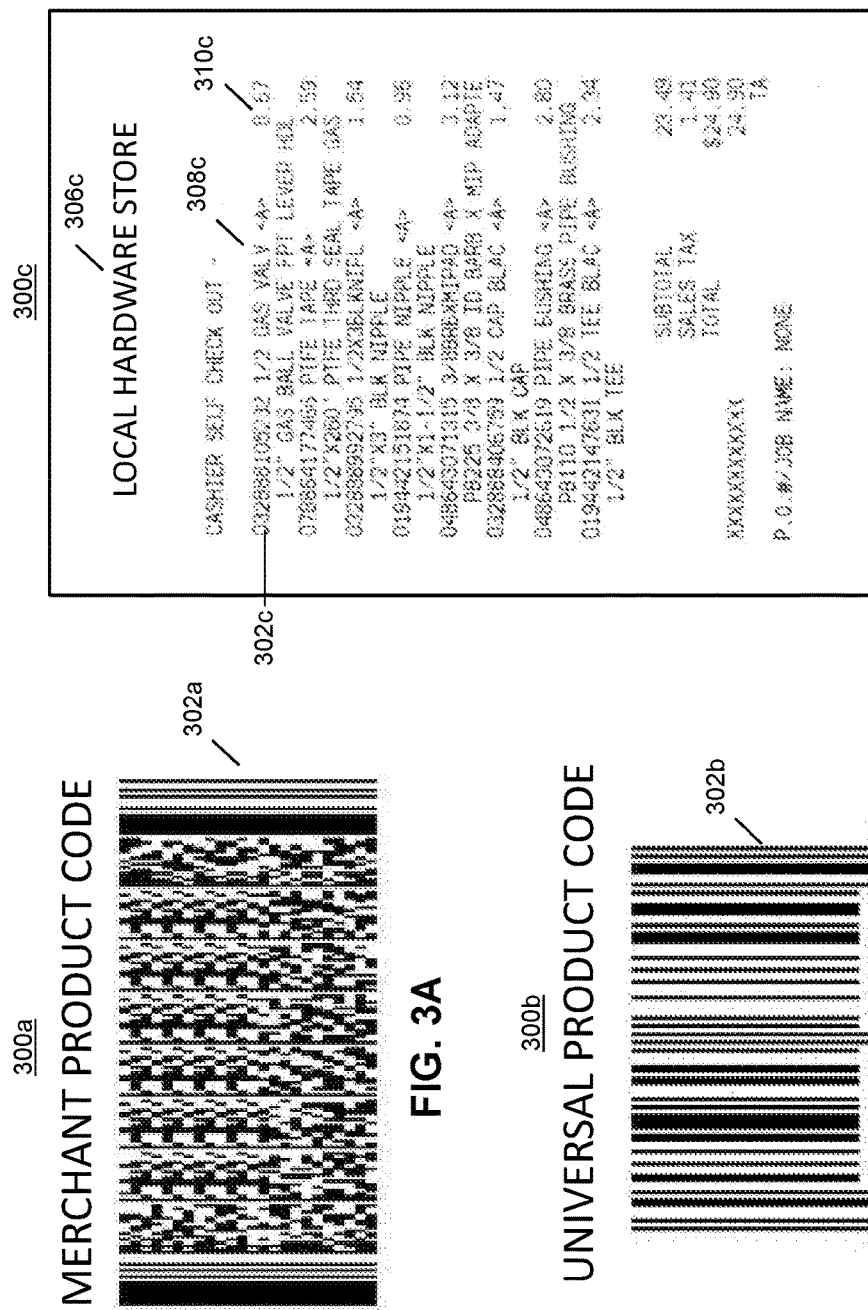
FIGS. 3A-3C are exemplary diagrams illustrating embodiments of different product codes identified on a paper receipt in accordance with exemplary embodiments.

FIGS. 3A-3C are exemplary diagrams illustrating embodiments of different product codes identified on a paper receipt in accordance with exemplary embodiments.

FIG. 3A illustrates an exemplary merchant product code 302a which may be placed on a product sold by the merchant. In an exemplary embodiment, a consumer may proceed to a checkout terminal to purchase a product (e.g., gas valve) from a merchant (e.g., local hardware store). The product may have a barcode and/or any other code in order to determine the product type, product classification, product price and/or any other information related to the product. The barcode may be read electronically via a scanning and/or input device. The code may be a merchant product code 302a which may be unique to each merchant. The merchant product code 302a may be, for example, one or more of: a QR code, a barcode, a data matrix code, a PDF417 code and/or any other type of code to identify a product at a checkout terminal.

In some implementations, if the product comprises a product code 300a, the system may query a database (e.g., merchant product database 216) to search for a corresponding UPC. The code may be a merchant product code 302a which may be unique to each merchant. The system may convert the product code comprising the merchant product code 302a to a UPC when the product identifier by querying a merchant product database based on the merchant identifier. The merchant product database 216 may comprise the merchant product code, a corresponding UPC, the product description, product options, product price information, and/or any other information about the product. In some implementations, the UPC may be affiliated with information about the product consistent with every other merchant. In some implementations, the merchant product code may provide additional information (e.g., price) for the product which may be unique to the merchant.

FIG. 3B illustrates an exemplary product code 300b which may be placed on a product sold by the merchant. In an exemplary embodiment, a consumer may proceed to a checkout terminal to purchase a product (e.g., gas valve) from a merchant (e.g., local hardware store). The product may have a barcode and/or any other code in order to determine the product type, product classification, product price and/or any other information related to the product. The barcode may be read electronically via a scanning and/or input device. The code may be a UPC 302b which may be universal to each merchant. In an exemplary embodiment, the UPC 304b may be applied by a supplier and/or distributor of the product. The UPC 304b may be, for example, one or more of: a QR code, a barcode, a data matrix code, a PDF417 code and/or any other type of code to identify a product at a checkout terminal.

In an exemplary embodiment, when the consumer is checking out at a point of sale terminal, the merchant may scan a bar code on the product the consumer is purchasing. The bar code on the product (e.g., merchant identifier) may determine the price and other product information. A processing device of the processing server 102 may determine if the merchant identifier corresponding to the one or more products presented at checkout comprises one of a plurality of merchant identifiers stored in the merchant product database. The merchant identifier may indicate a particular merchant (e.g., local hardware store) from a plurality of merchants (e.g., other stores in community).

When the merchant identifier is not one of the plurality of merchant identifiers stored in the merchant product database, the processing device may request one or more product data files for products sold by the merchant. In some implementations, the processing device may request this information from the particular merchant's server. For example, if the consumer is checking out at a local hardware store, and the processing server determines that it does not have any data from the local hardware store, the processing device may request data from the local hardware store. The data may comprise product data files including electronic records representing at least a product description, a product identifier, product options and product price information or hyperlinks to sources of this information, for one or more products sold by the merchant.

The processing device may store this information in one or more databases (e.g., merchant product database 216, receipt database 214, and/or any other database). The merchant product database of the processing server 102 may store a plurality of merchant identifiers. Each merchant identifier may be affiliated with one or more product data files for products sold by the merchant. Each product data file may include electronic records representing at least a product description, a product identifier, product options and/or product price information or hyperlinks to sources of this information. The product data files for the one or more products may be identified based on at least one of: the product description, the product identifier, the product price information and/or any other information affiliated with the product.

When the merchant identifier corresponding to the identified one or more products is one of the plurality of merchant identifiers stored in one or more (e.g., merchant product database 216, receipt database 214, and/or any other database), the processing device of the processing server executes a query on the merchant identifier to identify one or more product data files for products sold by the merchant corresponding to the identified one or more products and display the information on a digital receipt (e.g., electronic receipt).

FIG. 3C illustrates an exemplary paper receipt 300c which may be placed on a product sold by the merchant. In an exemplary embodiment, upon checkout at a register, the system may provide a paper receipt 300c and/or or a digital receipt to an electronic consumer device. In some implementations, the electronic consumer device may be at least one or more of: a mobile phone, a tablet, a computer and/or any other electronic device. The digital receipt may identify information similar to the paper receipt 300c which comprise data such as the store name 306c, the item description 308c, the product identifier (e.g., merchant product code and/or UPC) 302c, the price of the produce 310c, and/or any other information related to the transaction. The digital receipt may allow the consumer to select particular transactions to share with another consumer.

A receiving device of the processing server 102 may receive a transaction message for a payment transaction using the consumer identifier via a payment network. The transaction message may be formatted based on one or more standards and include a plurality of data elements including at least a first data element configured to store the merchant identifier and one or more additional data elements configured to store the line item data related to the one or more products.

The system may comprise a digital receipt database (e.g., receipt database 214) of a processing server, which may store a plurality of receipt data entries affiliated with a consumer account based on a consumer identifier. Each receipt data entry may comprise data identified on the paper receipt 300c including a merchant identifier 306c, and line item data 308c related to one or more products. In some implementations, the consumer identifier may be one or more of: credit card, a debit card, a bank card, a mobile payment and/or any other payment mechanism linked to a consumer.

Merchant Product Database

Figure 4:
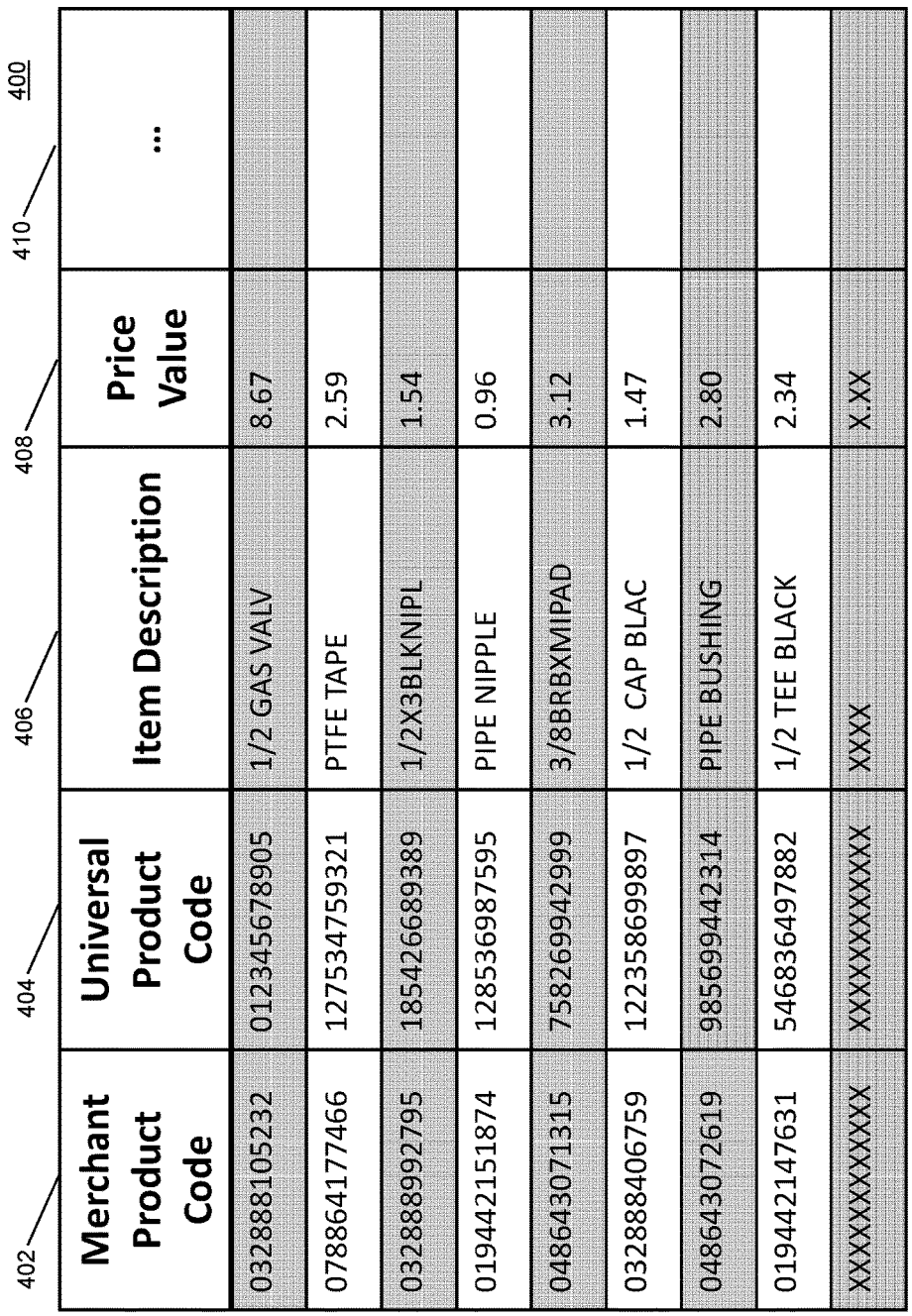
FIG. 4 is a table illustrating data stored in a merchant product database in accordance with exemplary embodiments.

FIG. 4 is a table 400 illustrating data stored in a merchant product database in accordance with exemplary embodiments.

It will be apparent to persons having skill in the relevant art that the merchant product database illustrated in FIG. 4 is provided as an exemplary embodiment, and that alternative representations of the data as associated with merchant product database using the methods discussed herein may be used in conjunction with the methods and systems discussed herein.

The processing server 102 may execute a query on the digital receipt database from a first consumer device to identify one or more products purchased in the payment transaction. In an exemplary embodiment, the merchant database may store a plurality of data comprising at least one or more of: a merchant product code, a UPC, an item description, a price value, and/or any other data relevant to a product. When the consumer presents a product with a merchant identifier (e.g., product and/or bar code) for checkout at a point of sale terminal, the processing server 102 may identify the information from the merchant identifier. The processing server 102 may determine if the information is based on a merchant product code 402 and/or a UPC 404. For either code, the processing server 102 may further query the merchant database to identify the item description 406, the price value 408 and/or any other information 410 relevant to the product. This information may then be presented on a digital receipt and/or physical receipt to the consumer. The processing device of the processing server 102 may generate a digital receipt displaying purchase information for the one or more products.

Exemplary Diagram Illustrating Sharing a Digital Receipt

Figure 5B:
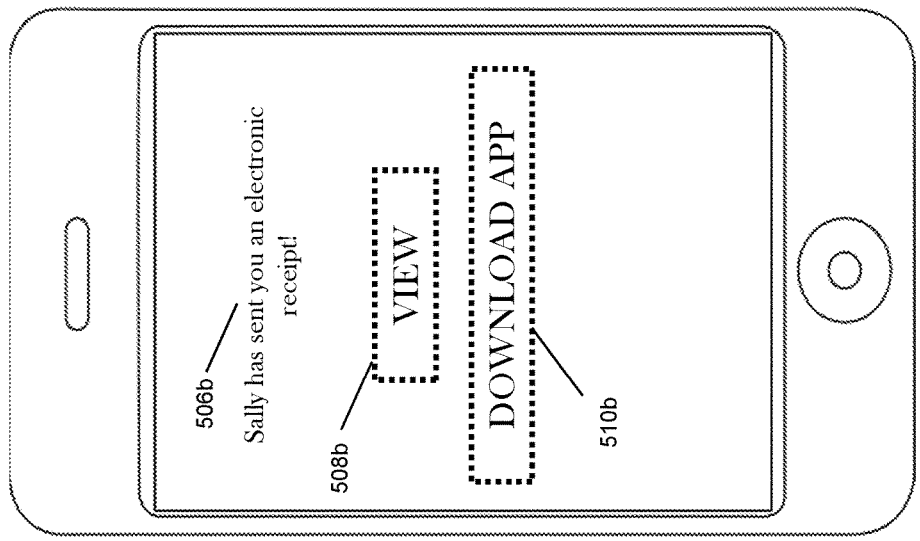
FIGS. 5A and 5B are exemplary diagrams illustrating displaying and sharing an electronic receipt on mobile devices in accordance with exemplary embodiments.
Figure 5A:
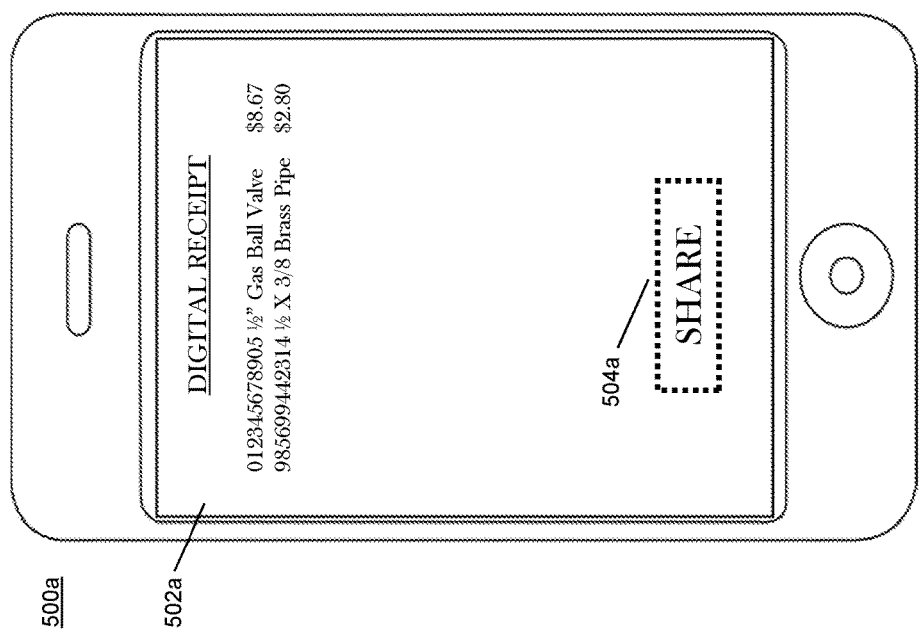

FIG. 5A is exemplary diagram 500a illustrating displaying and sharing an electronic receipt on mobile devices in accordance with exemplary embodiments.

The processing device of the processing server 102 may link the purchase information on the digital receipt 502a to the product data file for the one or more products appearing thereon either received from the merchant or identified in the digital receipt database. The transmitting device (e.g., transmitting unit 206) of the processing server 102 may transmit the digital receipt 502a. In some implementations, the digital receipt may be shared with other consumers. The digital receipt 502a may comprise a share button 504a which may provide a second screen (not shown) where the consumer who purchase the product may enter information about a second consumer (e.g., e-mail, telephone number, mailing address, social media account number, rewards card number, etc.) and the digital receipt 502a may be transmitted to the second consumer via method identified by the purchasing consumer. In some implementations, the consumer who purchased the products may be provided the option to select particular items to share with the second consumer.

FIG. 5B is exemplary diagram 500b illustrating displaying and sharing an electronic receipt on mobile devices in accordance with exemplary embodiments.

The second consumer device may display a message 506b when a digital receipt has been transmitted to it. For example, if the first consumer's name is Sally, the message may display that "Sally has sent you an electronic receipt!" The message may further provide the options to view 508b the digital receipt and/or download the application 510b in the case where the second consumer does not have the application already installed on the second consumer's device.

In some implementations, when the second consumer has a second consumer account based on a second consumer identifier, the digital receipt may be transmitted to the second consumer's device. The second consumer device may be provided the purchase information on the digital receipt for the product data file for the one or more products. The purchase information may permit the second consumer to purchase the one or more products via the second consumer device.

In some implementations, when the second consumer does not have the second consumer account based on the second consumer identifier, the processing server 102 may display on the second consumer's device a merchant information for the one or more products identifying a merchant name and the line item data related to the one or more products. The merchant information may comprise a link to a merchant website displaying the one or more products for purchase. The processing server 102 may provide a download option on the second consumer device to create a second consumer account in order to provide the second consumer device the purchase information on the digital receipt for the product data file for the one or more products.

In an exemplary embodiment, the second consumer device may obtain the same product price information as the first consumer device when the second consumer device purchases the one or more products. This may allow the second consumer to receive the exact discount the first consumer received. In implementations where the first consumer paid full price, the second consumer may have the option to pay full price as the first consumer, or if they have a coupon and/or discount they want reflected in the price, they may pay a reduced price upon initiating the request at the point of sale.

The digital receipt database (e.g., receipt database 214) of the processing server 102 may store a plurality of receipt data entries affiliated with the second consumer account based on the second consumer identifier. Each receipt data entry may include a merchant identifier, and/or a line item data related to one or more products. The receiving device (e.g., receiving unit 208) of the processing server 102 may receive a transaction message for a payment transaction using the second consumer identifier via a payment network. The transaction message may be formatted based on one or more standards and includes a plurality of data elements including at least a first data element configured to store the merchant identifier and one or more additional data elements configured to store the line item data related to the one or more products.

The processing device (e.g., processing unit 204) of the processing server 102 may execute a query on the digital receipt database from the second consumer device to identify one or more products. The processing device (e.g., processing unit 204) of the processing server 102 may generate a digital receipt displaying purchase information for the one or more products. The transmitting device (e.g., transmitting unit 206) of the processing server 102 may transmit the digital receipt to a third consumer device.

Exemplary Methods for Sharing Digital Receipts

Figure 6A:
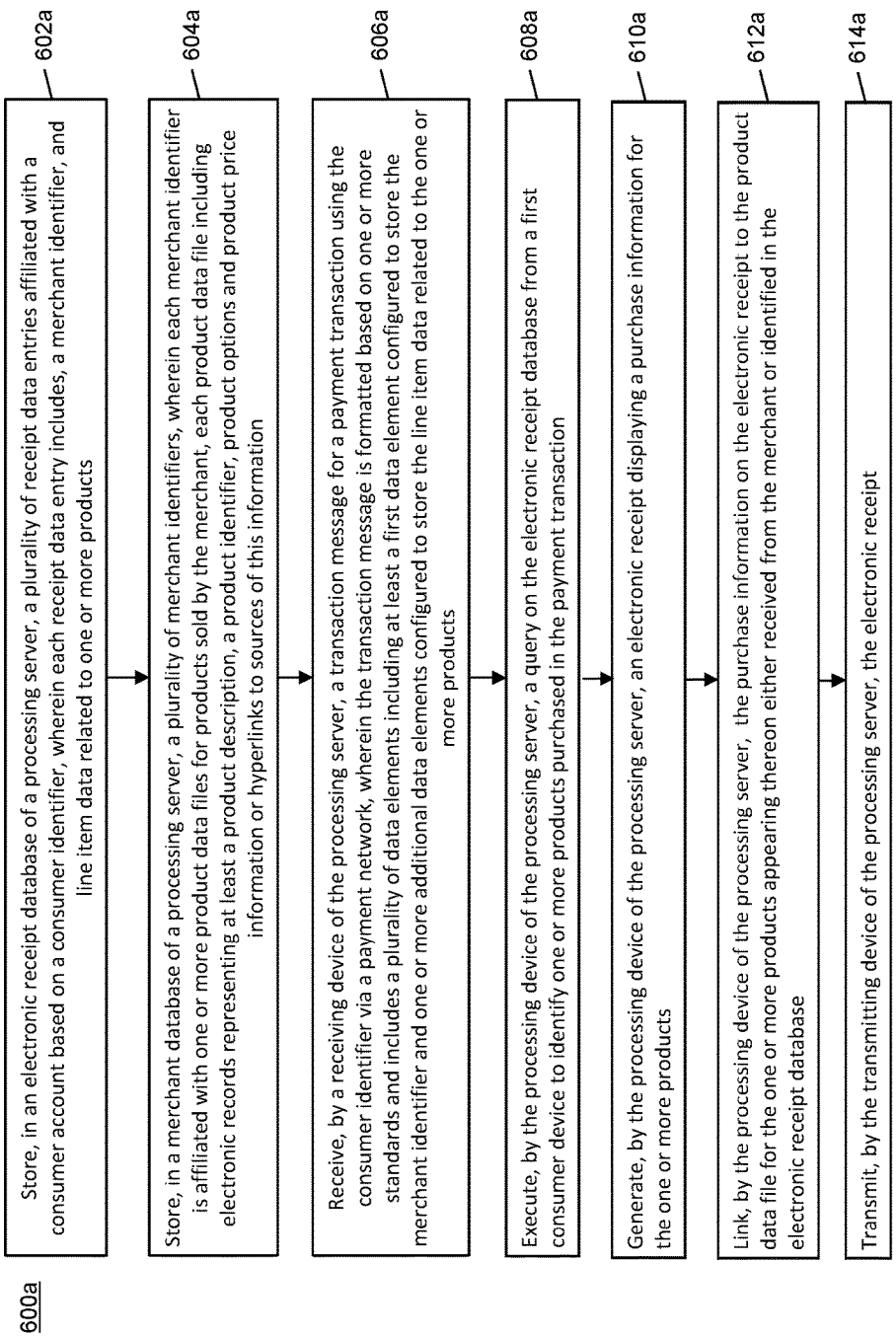
FIGS. 6A and 6B are exemplary flow charts illustrating exemplary methods for sharing digital product receipts for products using payment transaction data in accordance with exemplary embodiments.

FIG. 6A is an exemplary flow chart 600a illustrating an exemplary method for sharing digital product receipts using payment transaction data by transmitting line item data from a digital receipt in accordance with exemplary embodiments.

In step 602a, a plurality of receipt data entries affiliated with a consumer account based on a consumer identifier may be stored in a digital receipt database (e.g., receipt database 214) of a processing server (e.g., processing server 102). In some implementations, each receipt data entry may include a merchant identifier, and line item data related to one or more products. In some implementations, the consumer identifier is one or more of: credit card, a debit card, a bank card, and a mobile payment.

In step 604a, a plurality of merchant identifiers, may be stored in a merchant database (e.g., merchant product database 216) of a processing server (e.g., processing server 102). Each merchant identifier may be affiliated with one or more product data files for products sold by the merchant. Each product data file may include electronic records representing at least a product description, a product identifier, product options and product price information or hyperlinks to sources of this information. In some implementations, the product data files for the one or more products are identified based on at least one of: the product description, the product identifier, or the product price information.

In step 606a, a transaction message for a payment transaction using the consumer identifier via a payment network may be received by a receiving device (e.g., receiving unit 208) of the processing server (e.g., processing server 102). In some implementations, the transaction message may be formatted based on one or more standards and includes a plurality of data elements including at least a first data element configured to store the merchant identifier and one or more additional data elements configured to store the line item data related to the one or more products.

In step 608a, a query on the digital receipt database (e.g., receipt database 214) from a first consumer device to identify one or more products purchased in the payment transaction may be executed by the processing device (e.g., processing unit 204) of the processing server (e.g., processing server 102).

In step 610a, a digital receipt displaying purchase information for the one or more products may be generated by processing device (e.g., processing unit 204) of the processing server (e.g., processing server 102).

In step 612a, the purchase information on the digital receipt to the product data file for the one or more products appearing thereon either received from the merchant or identified in the digital receipt database (e.g., receipt database 214) may be linked by the processing device (e.g., processing unit 204) of the processing server (e.g., processing server 102).

In step 614a, the digital receipt may be transmitted by the transmitting device (e.g., transmitting unit 206) of the processing server (e.g., processing server 102).

Figure 6B:
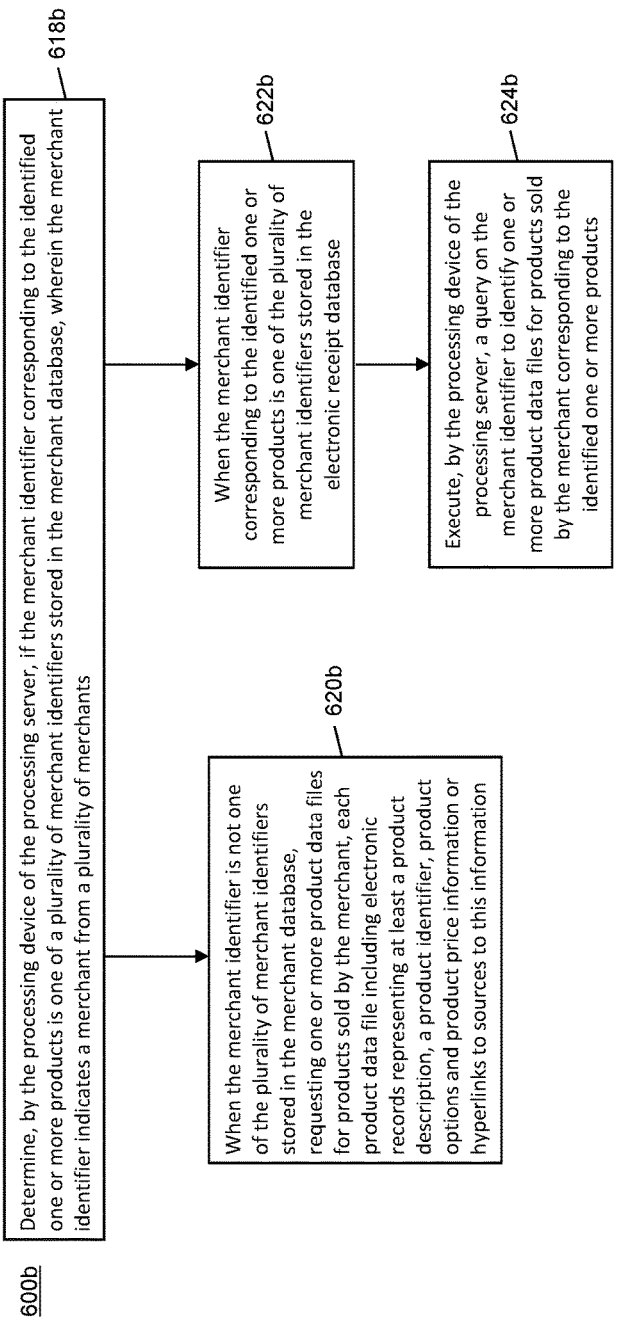

FIG. 6B is an exemplary flow chart 600b illustrating an exemplary method for sharing digital product receipts using payment transaction data by transmitting line item data from a digital receipt in accordance with exemplary embodiments.

In step 618b, if the merchant identifier corresponding to the identified one or more products is one of a plurality of merchant identifiers stored in the merchant database may be determined by the processing device (e.g., processing unit 204) of the processing server (e.g., processing server 102). The merchant identifier may indicate a merchant from a plurality of merchants.

In step 620b, when the merchant identifier is not one of the plurality of merchant identifiers stored in the merchant database the processing device (e.g., processing unit 204) of the processing server (e.g., processing server 102) may request one or more product data files for products sold by the merchant, each product data file including electronic records representing at least a product description, a product identifier, product options and product price information or hyperlinks to sources of this information.

In step 622b, when the merchant identifier corresponding to the identified one or more products is one of the plurality of merchant identifiers stored in the digital receipt database, the processing device (e.g., processing unit 204) of the processing server (e.g., processing server 102) may execute a query on the merchant identifier to identify one or more product data files for products sold by the merchant corresponding to the identified one or more products.

In step 624b, a query on the merchant identifier to identify one or more product data files for products sold by the merchant corresponding to the identified one or more products may be executed by the processing device (e.g., processing unit 204) of the processing server (e.g., processing server 102).

The processing device (e.g., processing unit 204) of the processing server (e.g., processing server 102) in the digital receipt database may convert the product identifier to a UPC when the product identifier is a merchant product code by querying the merchant database based on the merchant identifier, wherein the merchant database comprises the merchant product code, the UPC, the product description, product options and product price information. In some implementations, the merchant product code may be one or more of: a QR code, a barcode, a data matrix code, and a PDF417 code. In some implementations, the digital receipt is transmitted to a second consumer device, when the second consumer device has a second consumer account based on a second consumer identifier. The second consumer device may be provided the purchase information on the digital receipt for the product data file for the one or more products, wherein the purchase information permits the second consumer device to purchase the one or more products. When the second consumer device does not have the second consumer account based on the second consumer identifier, displaying a merchant information for the one or more products identifying a merchant name and the line item data related to the one or more products. In some implementations, the merchant information comprises a link to a merchant website displaying the one or more products for purchase.

In some implementations, a download option for the second consumer device may be provided to create the second consumer account in order to provide the second consumer device the purchase information on the digital receipt for the product data file for the one or more products.

In some implementations, the second consumer device may obtain the same product price information as the first consumer device when the second consumer device purchases the one or more products.

A plurality of receipt data entries affiliated with the second consumer account based on the second consumer identifier may be stored in the digital receipt database of the processing server. Each receipt data entry includes a merchant identifier, and a line item data related to one or more products.

A transaction message for a payment transaction using the second consumer identifier via a payment network may be received by the receiving device of the processing server. In some implementations the transaction message is formatted based on one or more standards and includes a plurality of data elements including at least a first data element configured to store the merchant identifier and one or more additional data elements configured to store the line item data related to the one or more products.

The processing device of the processing server 102 may execute a query on the digital receipt database from the second consumer device to identify one or more products. The processing device of the processing server 102 may generate a digital receipt displaying purchase information for the one or more products. The transmitting device of the processing server 102 may transmit the digital receipt to a third consumer device.

Payment Transaction Processing System and Process

Figure 7:
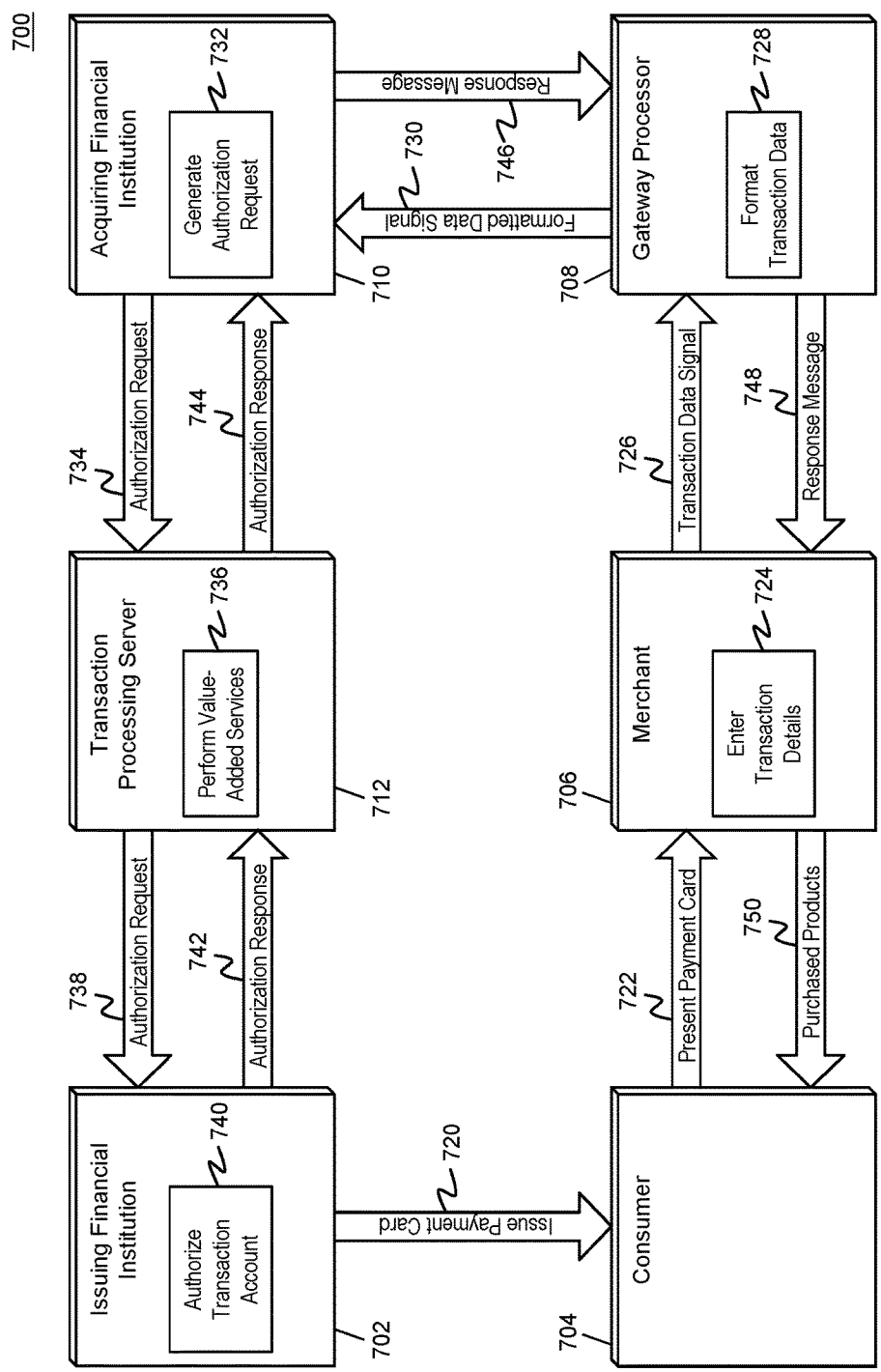
FIG. 7 is a flow diagram illustrating the processing of a payment transaction in accordance with exemplary embodiments.

FIG. 7 is a flow diagram illustrating the processing of a payment transaction in accordance with exemplary embodiments.

The process 700 and steps included therein may be performed by one or more components of the system 100 discussed above, such as the merchants 108, processing server 102, and payment network 112. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3-6, discussed above, with respect to the step or steps involved in the processing of a payment transaction. In addition, the entities discussed herein for performing the process 700 may include one or more computing devices or systems configured to perform the functions discussed below. For instance, the merchant 706 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 708 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 740 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 770, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 702. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
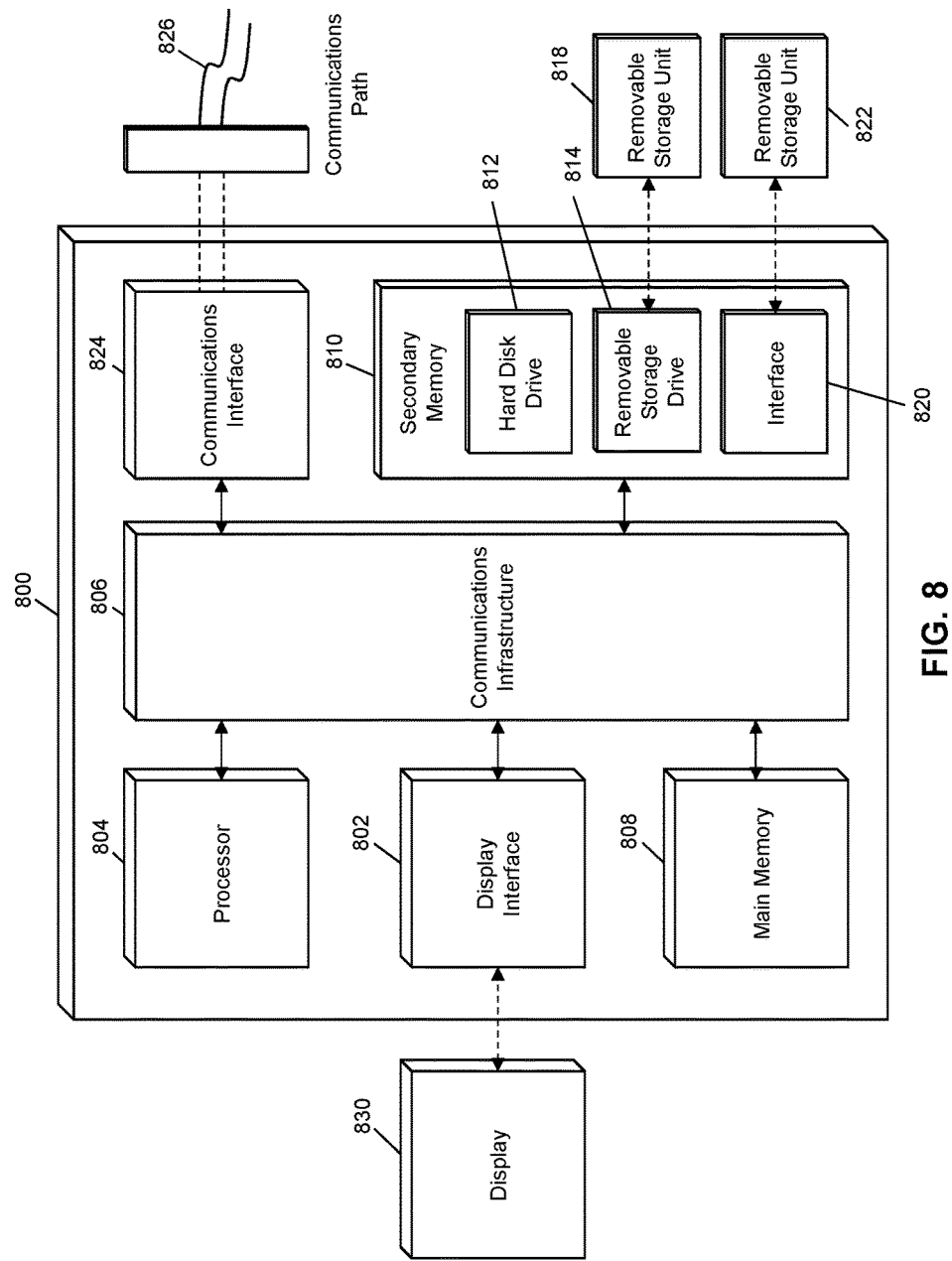
FIG. 8 is a block diagram illustrating a computer system architecture in accordance with exemplary embodiments.

FIG. 8 is a block diagram illustrating a computer system architecture in accordance with exemplary embodiments.

For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement, for example, the methods of FIGS. 4-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3 and 5-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for consumer verification of a payment transaction that exceeds previously established account limitations. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for transmitting line item data from an electronic receipt, comprising:
   storing, in an electronic receipt database of a processing server, a plurality of receipt data entries affiliated with a consumer account based on a consumer identifier, wherein each receipt data entry includes, a merchant identifier, and line item data related to one or more products;
   storing, in a merchant database of a processing server, a plurality of merchant identifiers, wherein each merchant identifier is affiliated with one or more product data files for products sold by the merchant, each product data file including electronic records representing at least a product description, a product identifier, product options and product price information or hyperlinks to sources of this information;
   receiving, by a receiving device of the processing server, a transaction message for a payment transaction using the consumer identifier via a payment network, wherein the transaction message is formatted based on one or more standards and includes a plurality of data elements including at least a first data element configured to store the merchant identifier and one or more additional data elements configured to store the line item data related to the one or more products;
   executing, by the processing device of the processing server, a query on the electronic receipt database from a first consumer device to identify one or more products purchased in the payment transaction;
   determining, by the processing device of the processing server, if the merchant identifier corresponding to the identified one or more products is one of a plurality of merchant identifiers stored in the merchant database, wherein the merchant identifier indicates a merchant from a plurality of merchants,
      when the merchant identifier is not one of the plurality of merchant identifiers stored in the merchant database, requesting one or more product data files for products sold by the merchant, each product data file including electronic records representing at least a product description, a product identifier, product options and product price information or hyperlinks to sources of this information,
      when the merchant identifier corresponding to the identified one or more products is one of the plurality of merchant identifiers stored in the electronic receipt database, executing, by the processing device of the processing server, a query on the merchant identifier to identify one or more product data files for products sold by the merchant corresponding to the identified one or more products;
   generating, by the processing device of the processing server, an electronic receipt displaying a purchase information for the one or more products;
   linking, by the processing device of the processing server, the purchase information on the electronic receipt to the product data file for the one or more products appearing thereon either received from the merchant or identified in the electronic receipt database; and
   transmitting, to a second consumer device, by the transmitting device of the processing server, the electronic receipt.

2. The method of claim 1, wherein the product data files for the one or more products are identified based on at least one of: the product description, the product identifier, or the product price information.

3. The method of claim 1, wherein the consumer identifier is one or more of: credit card, a debit card, a bank card, and a mobile payment.

4. The method of claim 1, further comprising:
   when the second consumer device has a second consumer account based on a second consumer identifier,
   providing the second consumer device the purchase information on the electronic receipt for the product data file for the one or more products, wherein the purchase information permits the second consumer device to purchase the one or more products, and
   when the second consumer device does not have the second consumer account based on the second consumer identifier,
   displaying a merchant information for the one or more products identifying a merchant name and the line item data related to the one or more products, and
   providing a download option for the second consumer device to create the second consumer account in order to provide the second consumer device the purchase information on the electronic receipt for the product data file for the one or more products.

5. The method of claim 4, wherein the second consumer device obtains the same product price information as the first consumer device when the second consumer device purchases the one or more products.

6. The method of claim 4, wherein the merchant information comprises a link to a merchant website displaying the one or more products for purchase.

7. The method of claim 4, further comprising:
   storing, in the electronic receipt database of the processing server, a plurality of receipt data entries affiliated with the second consumer account based on the second consumer identifier, wherein each receipt data entry includes, a merchant identifier, and a line item data related to one or more products; and
   receiving, by the receiving device of the processing server, a transaction message for a payment transaction using the second consumer identifier via a payment network, wherein the transaction message is formatted based on one or more standards and includes a plurality of data elements including at least a first data element configured to store the merchant identifier and one or more additional data elements configured to store the line item data related to the one or more products.

8. The method of claim 7, further comprising:
   executing, by the processing device of the processing server, a query on the electronic receipt database from the second consumer device to identify one or more products;
   generating, by the processing device of the processing server, an electronic receipt displaying a purchase information for the one or more products; and
   transmitting, by the transmitting device of the processing server, the electronic receipt to a third consumer device.

9. A method for transmitting line item data from an electronic receipt, comprising:
   storing, in an electronic receipt database of a processing server, a plurality of receipt data entries affiliated with a consumer account based on a consumer identifier, wherein each receipt data entry includes, a merchant identifier, and line item data related to one or more products;
   storing, in a merchant database of a processing server, a plurality of merchant identifiers, wherein each merchant identifier is affiliated with one or more product data files for products sold by the merchant, each product data file including electronic records representing at least a product description, a product identifier, product options and product price information or hyperlinks to sources of this information;

receiving, by a receiving device of the processing server, a transaction message for a payment transaction using the consumer identifier via a payment network, wherein the transaction message is formatted based on one or more standards and includes a plurality of data elements including at least a first data element configured to store the merchant identifier and one or more additional data elements configured to store the line item data related to the one or more products;

executing, by the processing device of the processing server, a query on the electronic receipt database from a first consumer device to identify one or more products purchased in the payment transaction;

determining, by the processing device of the processing server, if the merchant identifier corresponding to the identified one or more products is one of a plurality of merchant identifiers stored in the merchant database, wherein the merchant identifier indicates a merchant from a plurality of merchants, when the merchant identifier is not one of the plurality of merchant identifiers stored in the merchant database, requesting one or more product data files for products sold by the merchant, each product data file including electronic records representing at least a product description, a product identifier, product options and product price information or hyperlinks to sources of this information, when the merchant identifier corresponding to the identified one or more products is one of the plurality of merchant identifiers stored in the electronic receipt database, executing, by the processing device of the processing server, a query on the merchant identifier to identify one or more product data files for products sold by the merchant corresponding to the identified one or more products;

generating, by the processing device of the processing server, an electronic receipt displaying a purchase information for the one or more products;

linking, by the processing device of the processing server, the purchase information on the electronic receipt to the product data file for the one or more products appearing thereon either received from the merchant or identified in the electronic receipt database;

transmitting, by the transmitting device of the processing server, the electronic receipt and converting, by a processing device of the processing server in the electronic receipt database, the product identifier to a universal product code when the product identifier is a merchant product code by querying the merchant database based on the merchant identifier, wherein the merchant database comprises the merchant product code, the universal product code, the product description, product options and product price information.

10. The method of claim 9, wherein the merchant product code is one or more of: a QR code, a barcode, a data matrix code, and a PDF417 code.

11. A system for transmitting line item data from an electronic receipt, comprising:

an electronic receipt database of a processing server configured to store a plurality of receipt data entries affiliated with a consumer account based on a consumer identifier, wherein each receipt data entry includes, a merchant identifier, and line item data related to one or more products;

a merchant database of the processing server configured to store a plurality of merchant identifiers, wherein each merchant identifier is affiliated with one or more product data files for products sold by the merchant, each product data file including electronic records representing at least a product description, a product identifier, product options and product price information or hyperlinks to sources of this information;

a receiving device of the processing server configured to receive a transaction message for a payment transaction using the consumer identifier via a payment network, wherein the transaction message is formatted based on one or more standards and includes a plurality of data elements including at least a first data element configured to store the merchant identifier and one or more additional data elements configured to store the line item data related to the one or more products;

a processing device of the processing server configured to execute a query on the electronic receipt database from a first consumer device to identify one or more products purchased in the payment transaction;

determine if the merchant identifier corresponding to the identified one or more products is one of a plurality of merchant identifiers stored in the merchant database, wherein the merchant identifier indicates a merchant from a plurality of merchants, when the merchant identifier is not one of the plurality of merchant identifiers stored in the merchant database, requesting one or more product data files for products sold by the merchant, each product data file including electronic records representing at least a product description, a product identifier, product options and product price information or hyperlinks to sources of this information, when the merchant identifier corresponding to the identified one or more products is one of the plurality of merchant identifiers stored in the electronic receipt database, executing a query on the merchant identifier to identify one or more product data files for products sold by the merchant corresponding to the identified one or more products;

generate an electronic receipt displaying a purchase information for the one or more products;

link the purchase information on the electronic receipt to the product data file for the one or more products appearing thereon either received from the merchant or identified in the electronic receipt database; and a transmitting device of the processing server configured to transmit the electronic receipt to a second consumer device.

12. The system of claim 11, wherein the product data files for the one or more products are identified based on at least one of: the product description, the product identifier, or the product price information.

13. The system of claim 11, wherein the consumer identifier is one or more of: credit card, a debit card, a bank card, and a mobile payment.

14. The system of claim 11, wherein, when the second consumer device has a second consumer account based on a second consumer identifier, the transmitting device is further configured to provide the second consumer device the purchase information on the electronic receipt for the product data file for the one or more products, wherein the purchase information permits the second consumer device to purchase the one or more products, and when the second consumer device does not have the second consumer account based on the second consumer identifier, the transmitting device is further configured to transmit, for display on the second consumer device, a merchant information for the one or more products identifying a merchant name and the line item data related to the one or more products, and transmit a download option for the second consumer device to create the second consumer account in order to provide the second consumer device the purchase information on the electronic receipt for the product data file for the one or more products.

15. The system of claim 14, wherein the second consumer device obtains the same product price information as the first consumer device when the second consumer device purchases the one or more products.

16. The system of claim 14, wherein the merchant information comprises a link to a merchant website displaying the one or more products for purchase.

17. The system of claim 14, the electronic receipt database further configured to:

store a plurality of receipt data entries affiliated with the second consumer account based on the second consumer identifier, wherein each receipt data entry includes, a merchant identifier, and a line item data related to one or more products; and the receiving device further configured to receive a transaction message for a payment transaction using the second consumer identifier via a payment network, wherein the transaction message is formatted based on one or more standards and includes a plurality of data elements including at least a first data element configured to store the merchant identifier and one or more additional data elements configured to store the line item data related to the one or more products.

18. The system of claim 17, the processing device further configured to:

execute a query on the electronic receipt database from the second consumer device to identify one or more products; and generate an electronic receipt displaying a purchase information for the one or more products; and the transmitting device further configured to transmit the electronic receipt to a third consumer device.

19. A system for transmitting line item data from an electronic receipt, comprising:

an electronic receipt database of a processing server configured to store a plurality of receipt data entries affiliated with a consumer account based on a consumer identifier, wherein each receipt data entry includes, a merchant identifier, and line item data related to one or more products;

a merchant database of the processing server configured to store a plurality of merchant identifiers, wherein each merchant identifier is affiliated with one or more product data files for products sold by the merchant, each product data file including electronic records representing at least a product description, a product identifier, product options and product price information or hyperlinks to sources of this information;

a receiving device of the processing server configured to receive a transaction message for a payment transaction using the consumer identifier via a payment network, wherein the transaction message is formatted based on one or more standards and includes a plurality of data elements including at least a first data element configured to store the merchant identifier and one or more additional data elements configured to store the line item data related to the one or more products;

a processing device of the processing server configured to execute a query on the electronic receipt database from a first consumer device to identify one or more products purchased in the payment transaction;

determine if the merchant identifier corresponding to the identified one or more products is one of a plurality of merchant identifiers stored in the merchant database, wherein the merchant identifier indicates a merchant from a plurality of merchants, when the merchant identifier is not one of the plurality of merchant identifiers stored in the merchant database, requesting one or more product data files for products sold by the merchant, each product data file including electronic records representing at least a product description, a product identifier, product options and product price information or hyperlinks to sources of this information, when the merchant identifier corresponding to the identified one or more products is one of the plurality of merchant identifiers stored in the electronic receipt database, executing a query on the merchant identifier to identify one or more product data files for products sold by the merchant corresponding to the identified one or more products;

generate an electronic receipt displaying a purchase information for the one or more products;

link the purchase information on the electronic receipt to the product data file for the one or more products appearing thereon either received from the merchant or identified in the electronic receipt database, convert in the electronic receipt database, the product identifier to a universal product code when the product identifier is a merchant product code by querying the merchant database based on the merchant identifier, wherein the merchant database comprises the merchant product code, the universal product code, the product description, product options and product price information; and a transmitting device of the processing server configured to transmit the electronic receipt.

20. The system of claim 19, wherein the merchant product code is one or more of: a QR code, a barcode, a data matrix code, and a PDF417 code.

* * * * *